Feb. 14, 1939.   R. E. BASSETT, JR   2,146,930
LIQUID-PROPORTIONING DEVICE
Filed Feb. 23, 1937
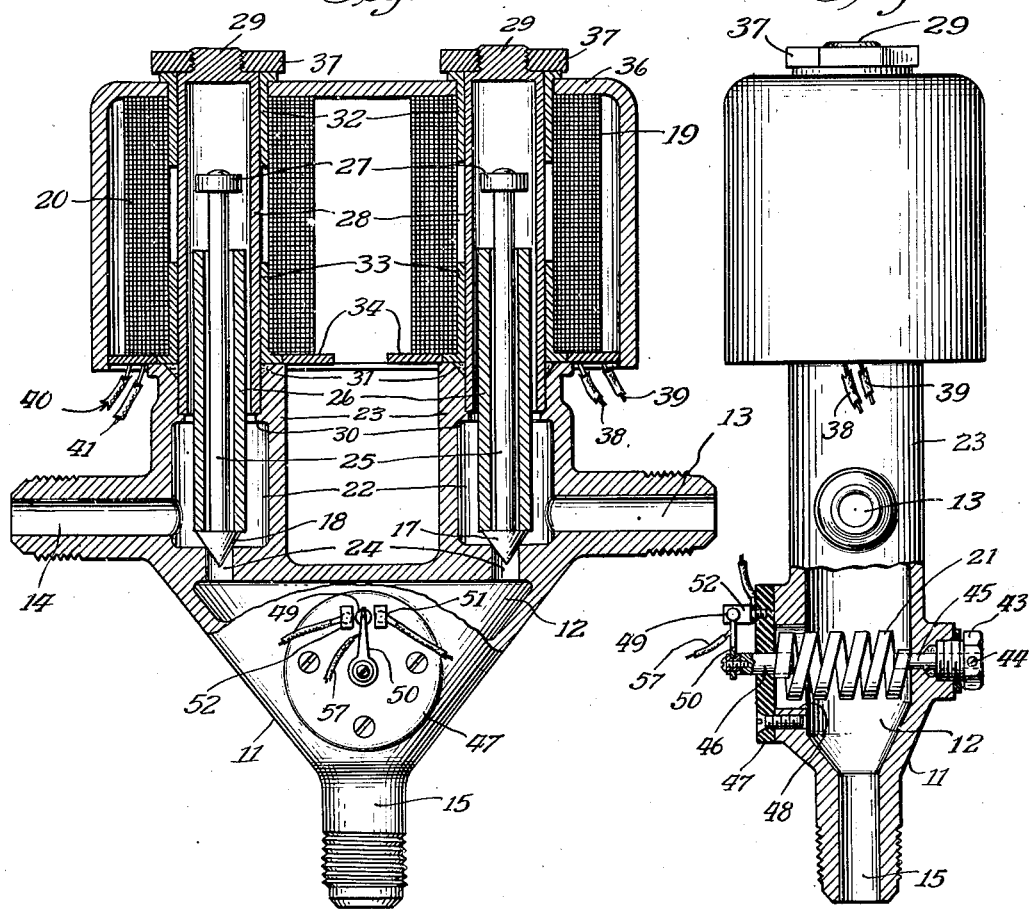
Inventor
Rex Earl Bassett Jr.
By Williams, Bradbury, McCaleb & Hinkle
Attys.

Patented Feb. 14, 1939

2,146,930

UNITED STATES PATENT OFFICE 2,146,930

LIQUID-PROPORTIONING DEVICE

Rex Earl Bassett, Jr., South Bend, Ind., assignor to Bendix Home Appliances, Inc., Detroit, Mich., a corporation of Delaware Application February 23, 1937, Serial No. 127,189

1 Claim. (Cl. 137—139)

In certain processes, such, for instance, as the washing or rinsing of textiles, it is important that the apparatus be provided with liquid at a temperature that remains within certain predetermined limits. In washing and rinsing woolen fabrics, it is essential that the water temperature be kept at a predetermined temperature to prevent shrinkage of the fabrics, and other fabrics can be washed more efficiently at certain temperatures. For these reasons in the textile washing arts, and for different reasons in other arts, it is essential that the device for providing liquid at a constant temperature be efficient and reliable in operation.

It is desirable to obtain the constant temperature liquid supply from a source of liquid at high temperature and a second source at low temperature as, for instance, the domestic hot water supply and the cold water supply, respectively. Thus, it is necessary to have a liquid-proportioning device capable of providing proper amounts of each of these liquids to furnish a constant temperature supply, irrespective of variations in the temperature of either the hot or cold water.

The principal object of the present invention is to provide a new and improved liquid-proportioning device adapted for use in washing machines, showers, or other devices requiring liquid of a constant temperature.

A more specific object of the invention is to provide a liquid-proportioning device adapted selectively to admit liquid to a proportioning chamber in response to temperature changes therein from each of a plurality of liquid supplies at different temperatures, whereby the liquid within the proportioning chamber is kept within predetermined temperature limits.

A further object of this invention is to provide a liquid-proportioning device with selectively operable control means, whereby either low or high temperature liquid alone may be supplied to the proportioning chamber.

Other objects and advantages of the invention will become apparent from the ensuing description, in which reference is had to the accompanying drawing illustrating a liquid-proportioning device embodying the present invention.

Fig. 1 is a front elevation, partly in section, of the liquid-proportioning device;

Fig. 2 is a side elevation, also partly in section, of the device; and

Fig. 3 is a wiring diagram of the control.

The specific drawing above referred to and the following description thereof are to disclose and illustrate an embodiment of the invention, and not to impose limitations on the claim.

The liquid-proportioning device of the present invention comprises a relatively small sized proportioning chamber supplied by two lines carrying liquids at different temperatures. The chamber has an outlet, from which an outlet line may lead to the tub of a washing machine, to a shower bath, or to any desired device.

The flow of liquid to the proportioning chamber is regulated by a pair of electrically operated, normally closed valves selectively energized by thermal responsive means located in said chamber. According to this arrangement the valves are selectively opened in response to temperature variations, so that liquid of one temperature or the other is admitted into the chamber for periods of time depending upon the amount of liquid necessary to maintain the temperature of the liquid in the proportioning chamber at a desired value.

The use of normally closed valves obviates the use of check valves to prevent flow of liquid from one supply line to the other in case the pressure of one exceeds that of the other.

In many instances it is desirable that either hot or cold water be available, and according to the present invention this is accomplished by providing a manually operable control means whereby the thermal responsive means may be rendered ineffective to control the valves, and either of the valves held continuously open.

Referring to Figs. 1 and 2 of the drawing, reference numeral 11 indicates a substantially triangular casting or unitary body structure of bronze or other non-corrosive material defining a centrally located, relatively small sized liquid proportioning chamber 12, provided with a pair of liquid inlets 13 and 14, and an outlet 15.

The inlets and outlet are formed as external bosses on the casting, and are suitably threaded for attachment to sources of liquid and to any device to be supplied with constant temperature liquid, respectively.

The flow of liquid into the proportioning chamber through inlet conduits 13 and 14 is regulated by a pair of normally closed valves 17 and 18 adapted selectively to be opened by solenoids 19 and 20, respectively, controlled in a manner hereinafter to be described, by a thermal responsive means, such as the bi-metallic helical coil 21, responsive to temperature changes of the liquid contained inside the chamber.

The valves are located in valve chambers 22, formed within vertical, external bosses 23, above the chamber 12, and when in the position illustrated, close openings 24, through which liquid enters the chamber. These openings are located near the opposite ends of the upper horizontal side of the chamber 12, so that liquid entering the latter is directed against the inclined sides of the chamber, and thereby effectively mixed with the liquid contained therein.

Each of the valves is formed at the lower end of a plunger rod 25, the valve and plunger preferably being made of a non-magnetic stainless steel. The valves and plungers are actuated upwardly upon energization of their respective actuating solenoids by upward movement of a solenoid core 26, made of magnetic stainless steel.

The core is somewhat shorter than the plunger rod, and is movable thereon between the valve and a collar 27 suitably fastened to the upper end of the plunger. It is apparent that the above-described construction is such that the core operates the valve with a snap action.

The core is surrounded by a brass body tube 28, having a closed threaded top 29, and resting upon an internal shoulder 30 formed on the boss 23 at the upper end of the valve chamber.

The body tubes are sealed to the valve chamber in liquid-tight fashion by welding or soldering them to the bosses 23, as indicated at 31. The solenoids are spaced from the body tubes by upper and lower tubular zinc spacers 32 and 33, respectively, and are supported on bosses 23 by zinc supporting washers 34. The solenoids are protected against damage by an iron casing 36, held in place by cover-retaining nuts 37, and are provided with lead wires 38, 39, 40, and 41, leading from solenoids 19 and 20, respectively.

The bi-metallic helical coil 21 is shown adjustably mounted within the proportioning chamber 12 so that the temperature of the outgoing liquid may be varied. Adjustment is obtained by rotation of a knob 43, secured by a set screw 44 to a shaft 45, journaled in casting 11 and mounting one end of the helical coil. The opposite end of the coil is fixedly attached to a shaft 46 journaled in a fibrous insulating disc 47, covering in watertight fashion a central opening 48 in the proportioning chamber, and secured to the latter by a plurality of screws.

The thermal responsive means need not be a helical coil as illustrated, and is not necessarily located within the chamber. It may assume the form of a flat bi-metallic strip mounted on the outside of the chamber in thermal communication with the liquid contained in the chamber.

The helical coil is adapted to actuate a movable contact 49 carried upon an arm 50, secured to and insulated from shaft 46. Movement of shaft 46 in one direction in response to a predetermined temperature variation in the liquid brings contact 49 into engagement with a stationary contact 51, and movement in the opposite direction in response to an opposite variation in temperature brings it into engagement with stationary contact 52. Contacts 51 and 52 are mounted upon the insulating disc 47.

Referring now to Fig. 3, it may be noted that contact 51 is connected to solenoid 19 through the previously mentioned lead wire 38, and contact 52 is similarly connected to solenoid 20 through lead wire 40. The opposite ends of the solenoids are connected to supply conductor 54 through lead wires 39 and 41, respectively. The other supply conductor 55 is connected to the movable contact 49 through a manually operable, four-position selector switch 56 and a conductor 57.

In the illustrated position the bi-metallic helical coil controls the energization of solenoids 19 and 20, and thereby the position of valves 17 and 18 controlling the flow of liquid to the proportioning chamber.

The selector switch is operable to close a circuit connecting the solenoids 19 and 20 directly across the source of supply through conductors 58 and 59, respectively, whereby liquid of only one temperature is supplied to the proportioning chamber.

The switch is also operable to a blank contact 60 to close both valves and thereby completely shut off the supply of water.

In order better to describe the operation of the proportioning device, it will be assumed that inlet 13 is connected to a source of hot water, and inlet 14 to a source of cold water. It will be assumed also that contacts 49 and 51 are brought into engagement when the temperature of the liquid in the proportioning chamber decreases below a predetermined lower temperature limit, and that contacts 49 and 52 are brought into engagement when the temperature in the chamber increases above a predetermined higher temperature limit. It should be noted that the movement of the movable contact 49 is limited to relatively narrow limits as the contacts 51 and 52 are positioned close together. Thus, the temperature limits referred to are close together so that one or the other of the solenoids is open most of the time. If the thermostat element is made too sluggish or the contacts spaced too far apart, there is a possibility that the proportioning chamber would not be adequately supplied with water.

Then, with selector switch 56 in the position illustrated, when the temperature of the liquid within the chamber decreases below the lower limit, solenoid 19 is energized by closure of a circuit across contacts 49 and 51, the energizing circuit extending from supply conductor 54, through conductor 39, to the solenoid 19, and thence through conductor 38, contacts 49 and 51 in engagement, conductor 57, and switch 56 to the other supply conductor 55.

Energization of solenoid 19 results in the upward movement of core 26 and the opening of valve 17 with snap action when the core engages collar 27.

Hot water is admitted into the proportioning chamber through conduit 13 and opening 24, and the water admitted into the chamber is thoroughly mixed with that contained therein, because of the fact that it strikes one of the inclined sides of the triangular proportioning chamber. The temperature of the water within the chamber rises, and the bi-metallic element effects disengagement of the contacts, and the supply of hot water is cut off in obvious fashion.

If the admission of hot water raises the temperature above the higher temperature limit, then a circuit is closed across contacts 49 and 52 to energize solenoid 20, and thereby effect opening of valve 18 to admit cold water to the proportioning chamber through conduit 14 and opening 24. As soon as the temperature of the water within the proportioning chamber decreases below the higher limit, the supply of cold water is cut off.

Under certain conditions the opening of the hot and cold water inlet valves may be alternate, as described above; and under other conditions one of the valves may be opened a plurality of times in succession. The mode of operation depends upon the temperatures of the respective sources and the operating temperature and characteristics of the thermal responsive means.

The operating temperature of the thermal responsive means may be readily varied by rotation of adjusting knob 43 to vary the position of the bi-metallic element.

Hot water alone may be obtained by operating selector switch 56 to close a circuit across conductors 55 and 58, thereby continuously energizing solenoid 19 and maintaining valve 17 open. Cold water can be obtained similarly by operation of switch 56 to close a circuit across the conductors 55 and 59. The supply of water may be cut off entirely whenever desired by simply operating switch 56 to its off position, that is, into engagement with blank contact 60.

While the proportioning device has not been illustrated as attached to any particular device, it should be understood that it may be so attached to washing machines, showers, or other devices.

I claim:

A liquid-proportioning device comprising a unitary structure including a body having a mixing chamber having an outlet for mixed liquids and having hot and cold inlet valve chambers separated from the mixing chamber by partitions formed with valve seats and having valves engageable with said seats and controlling communication with the mixing chamber, closed tubes secured over said valve chambers and sealed in liquid-tight relationship to said body, valve stems extending from said valves into said tubes and having stops at their ends, a magnetic core loosely sleeved on each of said stems and which is shorter than said stem so that when moved in one direction or the other it acts on said valve with an impact, a solenoid coil sleeved about each of said tubes, a casing for said coils resting on the upper ends of the coils and formed with openings through which the closed ends of the tubes project, parts mounted on the body about said tubes and on which the lower ends of the coils rest and which with said body close the lower side of said casing, and means on the closed ends of the tubes securing the casing detachably to said body.

REX EARL BASSETT, Jr.